(12) United States Patent
Worgan et al.

(10) Patent No.: US 11,761,609 B2
(45) Date of Patent: Sep. 19, 2023

(54) LUMINAIRE

(71) Applicant: FORGE EUROPA LTD, Preston (GB)

(72) Inventors: Michael Christopher Worgan, Ulverston (GB); David Gavin Scott-Maxwell, Broughton-in-Furness (GB); Richard Peter James Barton, Ulverston (GB)

(73) Assignee: FORGE EUROPA LTD, Lancashire (GB)

( * ) Notice: Subject to any disclaimer, the term of this patent is extended or adjusted under 35 U.S.C. 154(b) by 0 days.

(21) Appl. No.: 17/786,803

(22) PCT Filed: Dec. 15, 2020

(86) PCT No.: PCT/GB2020/053222
§ 371 (c)(1),
(2) Date: Jun. 17, 2022

(87) PCT Pub. No.: WO2021/123756
PCT Pub. Date: Jun. 24, 2021

(65) Prior Publication Data
US 2023/0015250 A1    Jan. 19, 2023

(30) Foreign Application Priority Data

Dec. 17, 2019    (GB) ..................... 1918664

(51) Int. Cl.
*F21V 7/04*    (2006.01)
*F21V 7/28*    (2018.01)
(Continued)

(52) U.S. Cl.
CPC .............. *F21V 7/041* (2013.01); *F21V 5/048* (2013.01); *F21V 7/0091* (2013.01); *F21V 7/28* (2018.02); *F21V 13/04* (2013.01); *F21S 8/026* (2013.01)

(58) Field of Classification Search
CPC . F21V 7/041; F21V 7/28; F21V 5/048; F21V 7/0091; F21V 13/04; F21V 13/00;
(Continued)

(56) References Cited

U.S. PATENT DOCUMENTS 3,633,022 A * 1/1972 Sassmanshausen .. F21S 41/162
359/721
4,285,034 A    8/1981 Sullivan
(Continued)

FOREIGN PATENT DOCUMENTS

EP    0561388 A1    9/1993
EP    0846914 A1    6/1998
(Continued)

*Primary Examiner* — Bao Q Truong
(74) *Attorney, Agent, or Firm* — Bochner PLLC; Andrew D. Bochner (57) ABSTRACT

Disclosed is a luminaire such as an LED downlight which is suitable for mounting in ceiling cavities of commercial environments. An example luminaire (200) comprises a light source (202) including an integral primary optic which is configured to transmit light toward a second optic (214). The second optic (214) is a lens configured to receive light from the light source (202) via the primary optic and transmit at least part of the received light toward a circular reflector (201). The circular reflector (201) is configured to direct light received from the second optic (214) away from the luminaire (204). A shape of the second optic (214) is interdependent with a shape of the circular reflector (201), and the shape of the second optic (214) and circular reflector (201) act in combination to transmit light away from the luminaire with a non-circular illuminance distribution (206).

16 Claims, 8 Drawing Sheets

(51) Int. Cl.
*F21V 5/04* (2006.01)
*F21V 7/00* (2006.01)
*F21V 13/04* (2006.01)
*F21S 8/02* (2006.01)

(58) Field of Classification Search
CPC ........ F21V 13/045; F21V 13/06; F21V 13/12; F21V 13/14; F21V 5/04; F21V 5/08; F21S 8/026
See application file for complete search history.

(56) References Cited

U.S. PATENT DOCUMENTS

| | | | |
|---|---|---|---|
| 5,816,694 A | | 10/1998 | Ideker et al. |
| 5,997,156 A | * | 12/1999 | Perlo ........................ F21V 5/002 |
| | | | 362/337 |
| 10,054,288 B2 | * | 8/2018 | Dyson ................... F21V 11/186 |
| 2012/0268949 A1 | | 10/2012 | Parkyn |
| 2014/0175966 A1 | * | 6/2014 | Tan ......................... F21K 9/233 |
| | | | 313/46 |
| 2017/0284611 A1 | * | 10/2017 | Lin ........................... F21V 5/02 |

FOREIGN PATENT DOCUMENTS

| | | |
|---|---|---|
| EP | 0890059 B1 | 6/2004 |
| WO | 2017/125370 A1 | 7/2017 |

\* cited by examiner

- PRIOR ART -

- PRIOR ART -

- PRIOR ART -

Total - Illuminance Map for Incident Flux
Cylinder 1 Surface lgt. Global Coordinates Min 0, Max 3929.3, Ave 1129.8
Total Flux 3549.3lm, Flux/Emitted Flux 0.70965 1442594 Incident Rays

LUMINAIRE

FIELD OF THE INVENTION

The present invention relates to luminaires, and in particular luminaires which can be used for wide-area illumination in commercial environments such as offices, airport, hospitals, hotels, and the like. More specifically, the present invention relates to a type of luminaire typically referred to as a downlight.

BACKGROUND

Generally, downlights have been very popular in commercial interior applications such as offices, schools, shops, hospitals, airports and such like for many years. Downlights provide task lighting and general illumination over wide areas efficiently, reliably, and unobtrusively. Their light sources have evolved over time from incandescent and halogen lamps to fluorescent lamps and more recently light emitting diodes (LEDs).

Figure 1A:
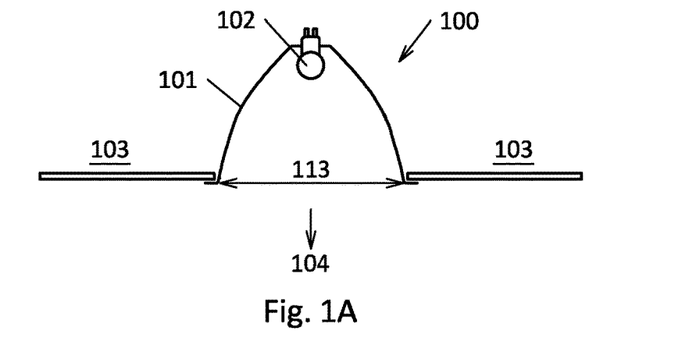
FIG. 1 shows an example prior art luminaire.
Figure 1B:
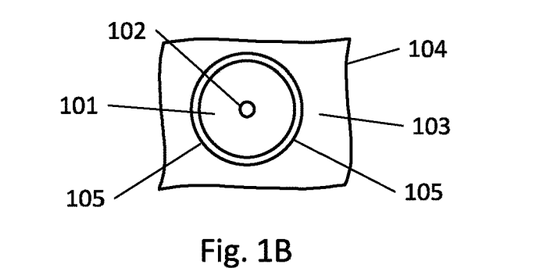
Figure 1C:
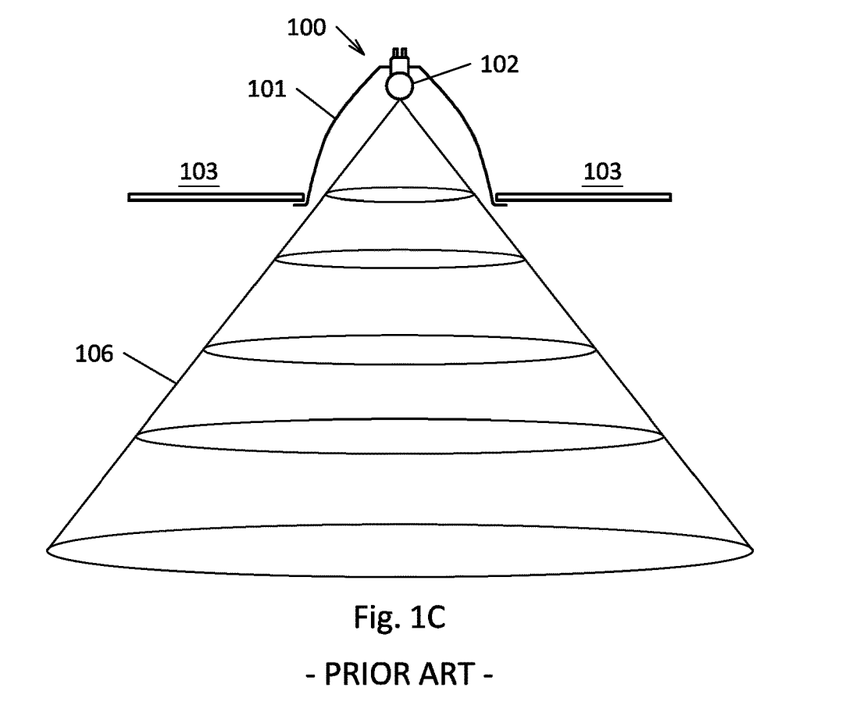

FIGS. 1A-1C show an example prior art downlight 100. The downlight 100 comprises an outer circular symmetric reflector 101 which directs light from a centrally located source 102 in such a way as to provide a narrower field of illumination 106 beneath the downlight 100 than would otherwise be realised from the light source 102 alone. By recessing the light source 102 within the downlight 100, glare is reduced, and the lack of light absorbing baffles or other optical means of blocking light aids high efficiency.

Typically, such a downlight 100 is recessed into a ceiling cavity 103, and is generally circular and symmetrical in appearance when viewed in the direction 104 below the downlight. An external diameter 105 of a typical downlight 100 ranges from a few tens of millimetres to several hundreds of millimetres. Here the downlight 100 provides circular and symmetrical illumination of the field 106 below the downlight 100.

Figure 2A:
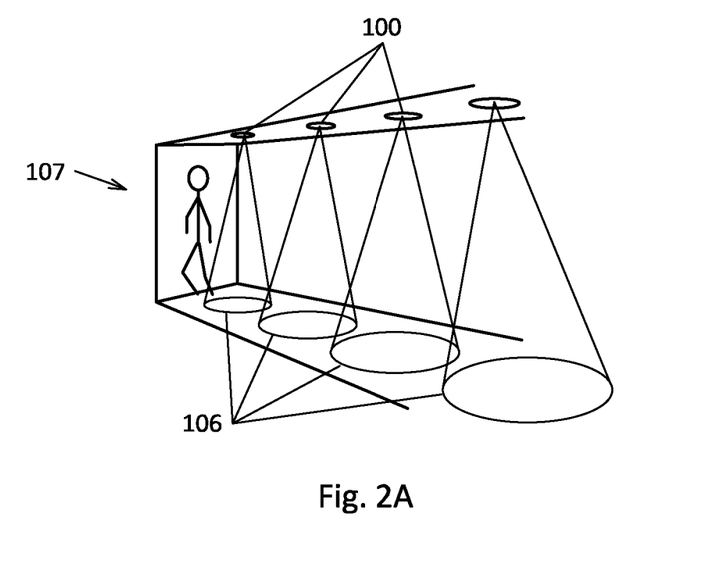
FIG. 2 shows example prior art luminaires installed in a corridor.
Figure 2B:
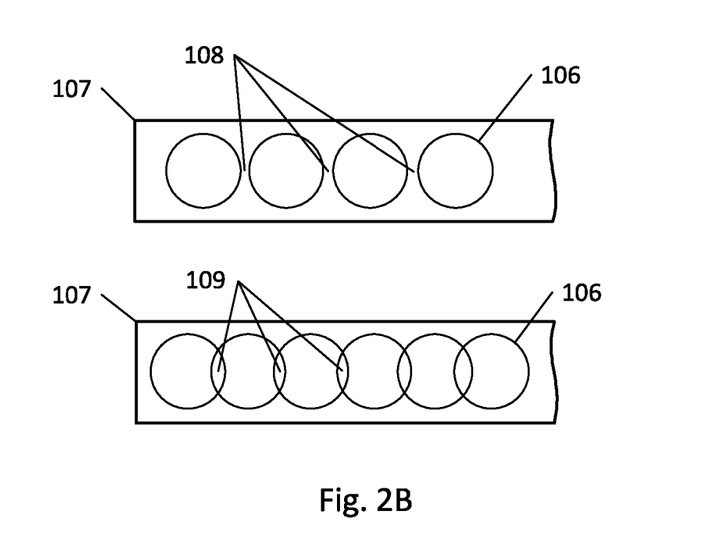

Many applications for downlights require more than one luminaire. Typical arrangements are either linear, for example to illuminate a corridor 107 as in FIG. 2A, or a grid or matrix, for example to illuminate an open office space. Luminaires which provide circular illumination are however limited in the uniformity of illumination they can provide. As shown by FIG. 2B, downlights arranged in a line, grid, or matrix, will result in uneven overall illumination because either dark zones 108 or bright zones 109 will exist between luminaires; the extent of these dark or bright zones 108, 109 depends of course on the relative spacing and distribution of the downlights 100 and their individual illumination geometry in the field 106 below the downlights 100.

The problem with trade-off between dark or bright zones 108, 109 is well known in the industry, and various improvements are incorporated in prior art which result in improved uniformity across the arrangement of luminaires. In particular, it is known to provide a modified generally square illumination.

Figure 3A:
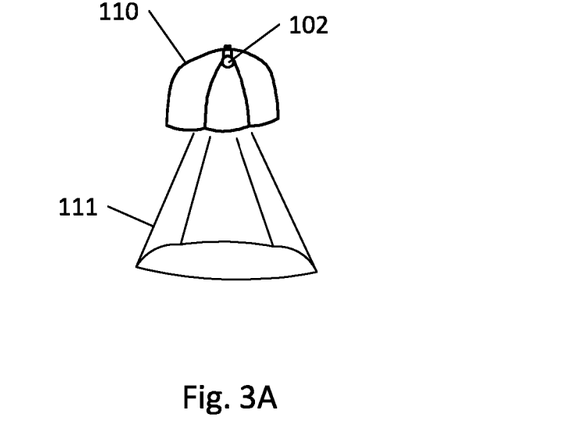
FIG. 3 shows further example prior art luminaires.

Various techniques for achieving such illumination are known, including the use of non-circular outer reflectors, non-circular baffles, and the like. For example, U.S. Pat. Nos. 5,816,694A, 4,462,068A and 6,497,500B1 all describe luminaires that employ non-circular outer reflectors 110 to create non-circular illumination geometries 111, as shown for example in FIG. 3A. U.S. Ser. No. 10/054,288B2 describes the use of a baffle and reflector to block light to create non-circular illumination 111.

Figure 3B:
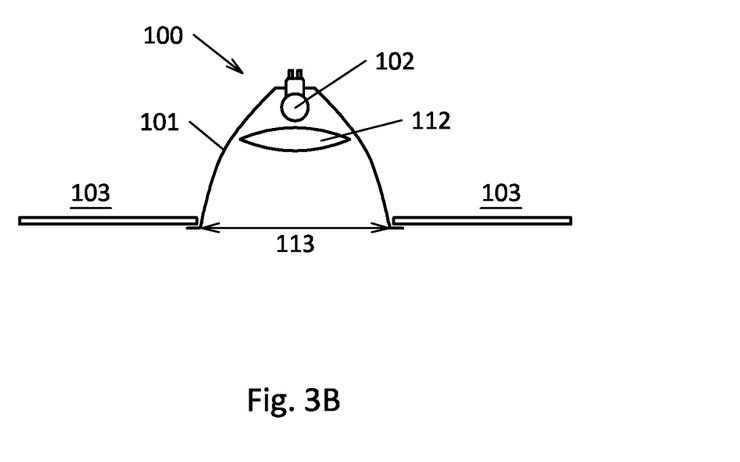

It is also well known from U.S. Pat. No. 8,602,602B2, U.S. Pat. No. 8,220,970B1, and U.S. Pat. No. 8,142,057B2, that illumination geometry can be improved by introducing an additional circular symmetric inner optic 112 with a circular symmetrical outer reflector 101, as shown by FIG. 3B.

The above solutions introduce new problems however, including increased glare arising from localised facets of non-circular geometry reflectors, inefficiency due to blocked light, increased manufacturing cost due to complexity of construction and use of multiple parts, and unattractive visual aesthetics.

Furthermore, glare has generally been reduced in downlight designs by increasing the ratio of the depth of the light source 102 behind a light emitting aperture 113 to the diameter of said light emitting aperture 113. In other words, glare is reduced by recessing the light source 102 deeply into the luminaire housing and various other means. In many designs intended to reduce glare, the ratio of the depth of the light source 102 behind a light emitting aperture 113 to the diameter of said light emitting aperture 113 is more than 1:2—i.e. the depth is equal to or greater than half the diameter—and in some instances can exceed 1:1—i.e. the depth is equal to or greater than the diameter. However, these measures have the undesirable effect of increasing the depth of the downlight thereby severely limiting usage in applications where ceiling cavity/void depth is limited.

The example embodiments described herein have been provided with a view to addressing at least some of the difficulties that are encountered with current downlights, whether those difficulties have been specifically mentioned above or will otherwise be appreciated from the discussion herein.

SUMMARY

It is an aim of example embodiments to overcome at least one of the above or other disadvantages associated with known LED downlights. In particular, it is an aim of the present invention to build on the principle of multiple optical elements to provide the well-known benefits of non-circular illumination (for example increased lighting installation efficiency) but without the aforementioned problems of efficiency loss through baffles, increased cost due to complexity, and unattractive aesthetics.

The present invention is defined according to the independent claims. Additional features will be appreciated from the dependent claims and the description herein. Any embodiments which are described but which do not fall within the scope of the claims are to be interpreted merely as examples useful for a better understanding of the invention.

In one aspect of the invention there is described a luminaire suitable for mounting in a ceiling cavity. The luminaire comprises a light source including an integral primary optic which is configured to transmit light toward a second optic. The second optic is a lens configured to receive light from the light source via the primary optic and transmit at least part of the received light toward a circular reflector. The circular reflector is configured to direct light received from the second optic away from the luminaire. A shape of the second optic is interdependent with a shape of the circular reflector, and the shape of the second optic and circular reflector act in combination to transmit light away from the luminaire with a non-circular illuminance distribution.

Non-circular illuminance allows for the luminaire to be used in an array of such devices to more evenly illuminate a specific area of an environment, for example square illuminance for a square room. The interdependent relationship between the second optic and the circular reflector allows for reduced glare compared to prior art systems. The circular reflector allows for simplicity of construction and installation—circular downlights are common and somewhat expected in the industry—as well as maintaining an important aesthetic quality.

In one example the second optic directs light evenly across an inner surface of the circular reflector, thereby reducing overall luminance and glare from the luminaire.

In one example light which is transmitted toward the circular reflector by the second optic has been reflected by the second optic, for example by total internal reflection. In this way the size and shape of the circular reflector can be accurately, and controllably determined.

In one example the second optic comprises at least one outer lens surface and one inner lens surface, such as will be common in total internal reflection lenses. One or more of the inner and outer surfaces of the lens may be deformed to a predetermined degree; for example, a respective surface may depart from circular. Suitably, deforming one or more of the inner and outer surfaces of the lens may comprise flattening a first surface proximate to a centre of the lens. Flattening of different surfaces of the lens allows for control over the light emission from the lens, the size and shape of the circular reflector, and the ultimate illuminance pattern produced by the luminaire.

In one example the non-circular illuminance distribution is a 'lazy square'. Suitably a deformed surface of the lens may be quadrant symmetrical, thereby comprising four flattened areas with corresponding corners.

In one example the non-circular illuminance distribution is triangular. Suitably a deformed surface of the lens may comprise three flattened areas.

In other examples other illuminance patterns may be achieved with suitable flattened regions of the lens, as appropriate.

In one example the second optic is mounted centrally within the luminaire. In this way ease of design of the lens and reflector may be maintained, as well as ease of construction and also maintenance of a pleasing aesthetic factor.

In one example the second optic further comprises a flange corresponding to the shape of the illuminance pattern. The flange allows for an installer of the luminaire to determine the orientation of the illuminance pattern that will result from the luminaire, and therefore allows for accurate installation of the luminaire with respect to the environment it is intended to illuminate and also other luminaires in an array of luminaires.

In one example the circular reflector forms a dome-like structure around the second optic. The circular reflector may also be smooth and have a uniform curvature. An inner surface of the reflector may comprise a specular or a diffused coating. The circular reflector may be configured to direct light through an aperture defined by the circular reflector.

In one example the circular reflector is a unitary structure and may be particularly suited for spin forming which allows for easy and low-cost construction. In an alternative example the circular reflector may be formed from a plurality of segments; again, ease of manufacture is achieved, albeit in an alternative form.

In one example the aforementioned second optic may be replaced by a metal reflector. The metal reflector may comprise a plastic body to which a metallic coat is applied to form the reflection component. In this way cost of production of the luminaire may be reduced compared to using a lens as the second optic.

In another aspect of the invention there is described a housing for use with the aforementioned luminaire. Suitably the housing may be manufactured separate to the luminaire yet provide suitably functions such as means for cooling the luminaire and means for mounting the luminaire, e.g. in a ceiling cavity.

In another aspect of the invention there is described a method of manufacture of a luminaire comprising arranging a light source including an integral primary to transmit light toward a second optic, arranging the second optic to transmit at least part of the received light toward a circular reflector, arranging the circular reflector to direct light received from the second optic away from the luminaire, and configuring a shape of the second optic to be interdependent with a shape of the circular reflector such that the second optic and circular reflector act in combination to transmit light away from the luminaire with a non-circular illuminance distribution.

In another aspect of the invention there is described a method of manufacture of a circular reflector for use in the aforementioned luminaire, the method comprising spin forming the circular reflector such that the circular reflector has unitary structure and surface.

BRIEF DESCRIPTION OF THE DRAWINGS

The invention will now be described by way of example only with reference to the accompanying drawings, in which.

DETAILED DESCRIPTION OF EXAMPLE EMBODIMENTS

At least some of the following example embodiments provide an improved luminaire, preferably an improved LED downlight. In particular, the following examples describe a luminaire which may create a non-circular illuminance distribution with reduced glare and complexity of construction. Many other advantages and improvements will be appreciated from the discussion herein.

Figure 4A:
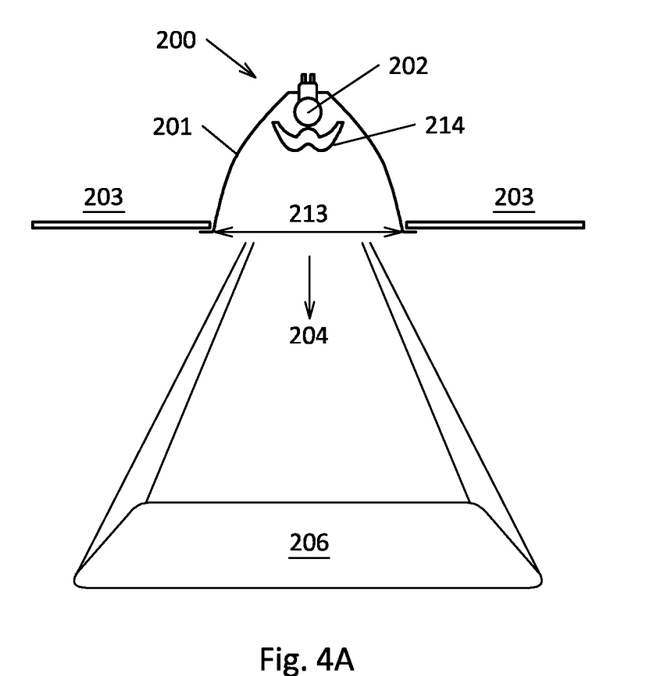
FIG. 4 shows an example luminaire of the invention.
Figure 4B:
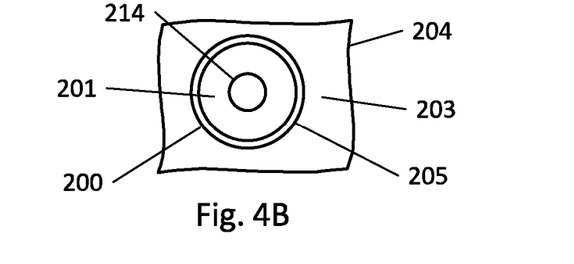

By way of introduction, and with reference to FIGS. 4A & 4B, the present disclosure provides for both low glare and shallow luminaire depth by using an inner optic 214 to distribute light evenly over an inner surface of an outer reflector 201, whereupon the light incident upon the outer reflector 201 is distributed downward in a direction 204 to provide a non-circular illumination.

In terminology familiar to those skilled in the art, a preferred embodiment of the invention uniquely combines a circular symmetrical outer reflector 201 in cooperation with an inner optic 214, whereby the outer reflector 201 and inner optic 214 are specifically designed together to produce non-circular light emission—that is, their design is interdependent. Thus, the external appearance of the luminaire 200, when viewed from a direction 204 below the luminaire 200, is of a substantially circular downlight which is aesthetically pleasing and has low glare and low luminaire depth. For example, a luminaire so designed could have a diameter 213 of 200 mm with a depth of less than 100 mm, possibly as low as 60 mm or less. That is, the ratio of depth to diameter can be better than 1:2, and preferably in the range of 1:2 to 3:10.

The surface of the outer reflector 201 is smooth and uniform, and is illuminated by the inner optic 214 in an even a way as possible, such that the resulting luminance from the surface of the outer reflector 201 is as low and as homogenous as possible, while simultaneously creating non-circular illumination such as square, triangular, hexagonal or the like. A value of luminance from the surface of the outer reflector 201 typically considered low by those skilled in the art would be 3000 cd/m2 at a viewing angle of 55 degrees.

In more detail, FIGS. 4A & 4B show an example luminaire 200 comprising a light source 202 with an integral primary optic (as will be known from e.g. EP0890059), a second optic 214, and a circular outer reflector 201.

The second optic 214 is configured to receive light from the light source 202 via the integral primary optic. The second optic 214 is arranged to transmit at least part of the received light towards the circular outer reflector 201. In this example the second optic 214 is mounted centrally within the luminaire 200, although other arrangements of the second optic 214 are possible. The second optic 214 is preferably a lens, and further preferably a total internal reflection 'TIR' lens; such a lens may be made for example from injection moulded plastic, as will be known to those skilled in the art. As already alluded to above, and discussed further below, the lens 214 is specifically shaped for use in this system.

Optionally, the second optic 214 could be a metal reflector (or a metal coated plastic reflector), or more generally any optic which might be considered to have a single active surface (in contrast to multiple active surfaces of a TIR lens).

The circular outer reflector 201 is configured to direct light received from the lens 214 away from the luminaire 200. That is, the circular outer reflector 201 is configured to direct light in the direction 204 through an opening/aperture 213 defined by the reflector 201, away from a ceiling cavity 203. Here the opening 213 is defined by an open edge of the reflector 201 with diameter 205. In addition, light transmitted by the lens 214 which is not received by the reflector 201 can also be transmitted away from the luminaire 200 through the opening 213. The term circular is used here to denote the appearance of the reflector 201 when viewed from the direction 204 below the luminaire 200, and in particular the appearance of the aperture 213.

A shape of the lens 214 and a shape of the reflector 201 are interdependent. That is, the shapes of the lens 214 and reflector 201 are specifically designed to be related to one another and thereby to work specifically in combination. Notably, the shape of the lens 214 and reflector 201 act in combination to transmit light away from the luminaire 200, substantially in the direction 204, with a non-circular illuminance distribution.

Figure 5:
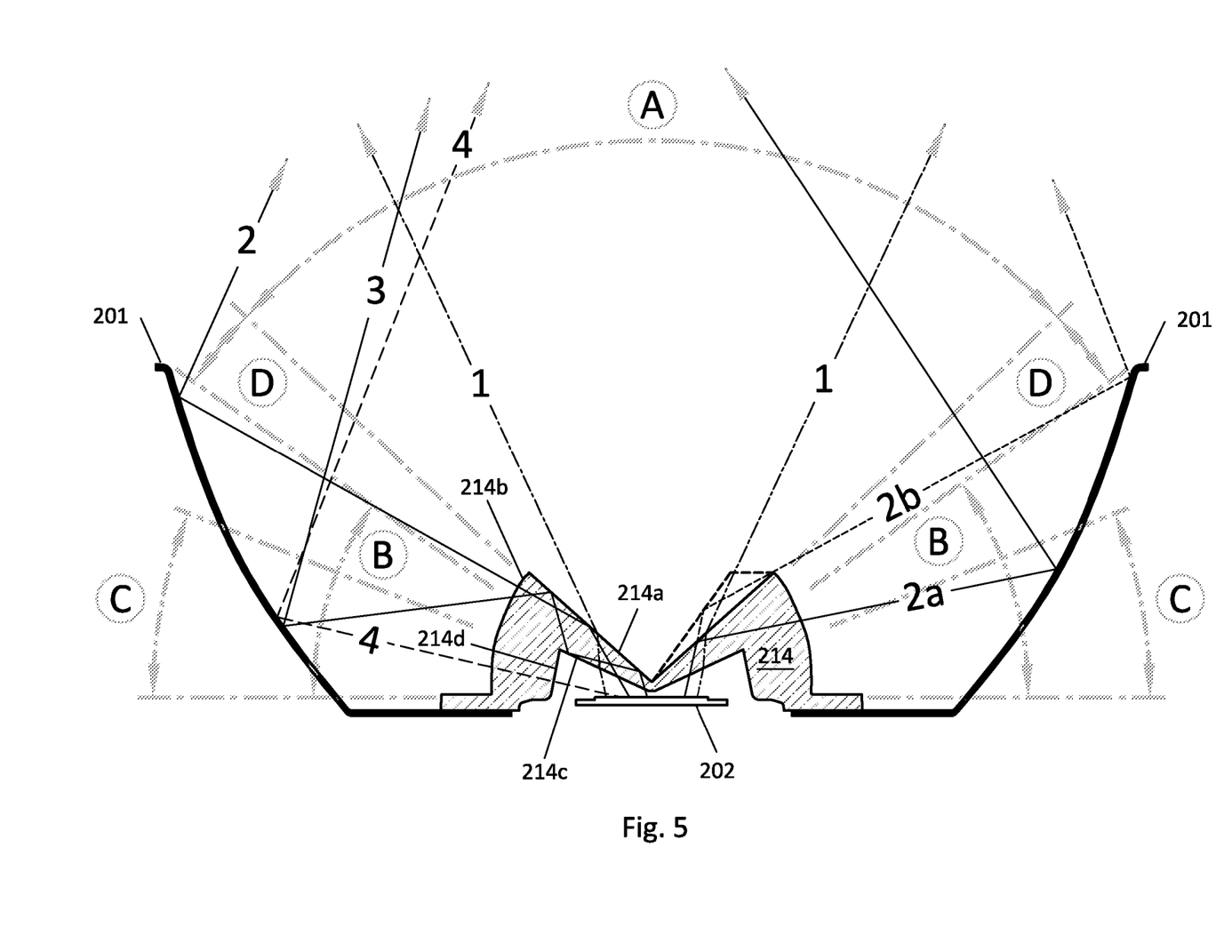
FIG. 5 shows example light emission from the example luminaire.

FIG. 5 shows an example of this interrelated design in action in the context of the preferred embodiment of a TIR lens. A TIR lens may comprise one or more inner surfaces and one or more outer surfaces. In this example the TIR lens comprises a first surface 214a, second surface 214b, third surface 214c, and fourth surface 214d. The first and second surfaces 214a,b are outer surfaces and the third and fourth surfaces 214c,d are inner surfaces.

In general, the optic 214 gathers light from the light source 202 and directs it onto the reflector 201. To reduce glare, it is desirable that the luminaire have low luminance (for example <3000 cd/m2 at a viewing angle of 55 degrees), especially at the high emission angles towards the limit (i.e. extremities) of the luminaire beam. The light intensity (cd) required at these angles to give even illuminance uniformity on the ground is a finite value. Thus, in order to lower the luminance (cd/m2) it is desirable to increase the viewed area of the emission. To achieve this the optic 214 is designed to direct light evenly to give a large emission area on the reflector.

The lens 214 collects light transmitted by the light source 202. Preferably, lens 214 is mounted as close to the surface of the primary optic as possible and so in practice, the lens 214 collects all light transmitted by the light source 202.

Light emitted from the light source 202 which is incident on the first surface 214a at an angle alpha which is less than the critical angle of the first surface 214a, is emitted through lens surface 214a into arc-area A (ray 1). This light emission increases the viewed area of emission from the luminaire, which helps to reduce average luminance (cd/m2) and hence reduce glare. The angle of lens surface 214a is such that arc-area A is limited to viewing angles which are not glare critical—i.e. glare is not typically a consideration at these angles, for example 45 degrees or less.

Light which is incident on the first surface 214a at an angle beta which is greater than the critical angle is totally internally reflected. This light exits the lens 214 within an arc-area B to illuminate the reflector 201.

There are two possible routes for light which is incident on the first surface 214a at an angle beta. Some of the light will take a path such as ray 2, which reflects from first surface 214a to head directly towards the reflector 201 through the second surface 214b. Other light will take a path such as ray 3, which reflects from the first surface 214a toward the third surface 214c, then back towards the first surface 214a again. After at least one reflection of this type the light exits the lens 214 toward the reflector 201 through the second surface 214b. Multiple reflections in this manner cause light to be spread more evenly onto the surface of reflector 201, which reduces Luminance (cd/m2) and glare. In this way the gap between the first lens surface 214a and third lens surface 214c acts as a waveguide, gathering light from the LED and distributing it evenly on the reflector 201.

Light emitted from the light source 202 toward the fourth surface 214d will be incident on the fourth surface 214d at an angle gamma less than the critical angle, and so is transmitted through the fourth surface 214d and second surface 214b to illuminate the reflector 201 (ray 4).

A final component of the light from the light source 202 may be emitted at an angle such that the combination of refractions and reflections cause the light to exit the lens 214 in the arc-area D. This light is not incident on the reflector 201 and provides high glare if viewing the luminaire in the arc-area D. The shapes and spacing of the internal and outer surfaces 214a—d are designed so as to minimise emission in arc-area D as far as possible, and preferably to eliminate it entirely.

In order to provide a non-circular illuminance pattern, one or more of the surfaces 214a—d of the lens 214, which are otherwise circular in nature, are flattened to a certain (predetermined) degree. Put another way, the surfaces 214a—d which are flattened result in a lens 214 with bowed (/flat) sides and radiused corners.

Figure 6A:
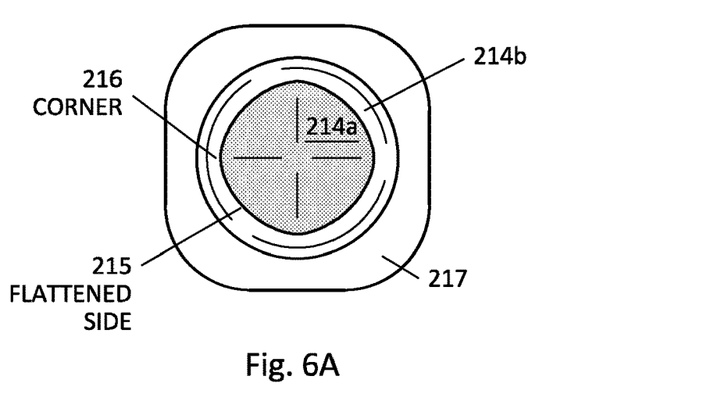
FIG. 6 shows an example second optic and its resulting illuminance distribution.

FIG. 6A shows a preferred example whereby the first surface 214a—that is, the outer surface of the lens 214 closest to the centre of the lens 214—is flattened in order to provide a square illuminance distribution. Here the first surface 214a is deformed—that is, it departs from an otherwise circular shape—to be quadrant symmetrical, with four flattened sides 215 and corresponding corners 216. Such an arrangement allows for the optic 214 to retain an aesthetically pleasing circular appearance. For example, for a 45 mm diameter lens 214, flattening in the range 1 mm to 3 mm produces a suitable optical effect while retaining an aesthetically pleasing circular appearance.

Suitably, the lens 214 may be provided with a flange 217 corresponding to the shape of the illuminance pattern. The flange 217 shows the correct orientation of the luminaire 200 when the luminaire is mounted in place (i.e. ready to illuminate a designated area). Thus in the present example the flange 217 is square, and the edges of the flange 217 would be aligned with sides or walls of an (also square) area to be illuminated (e.g. area 207, FIG. 6C). This is particularly important because the finished luminaire is preferably circular, and so without such a flange 217 there would be no indication of which way to orient the luminaire in its mounting.

Figure 6B:
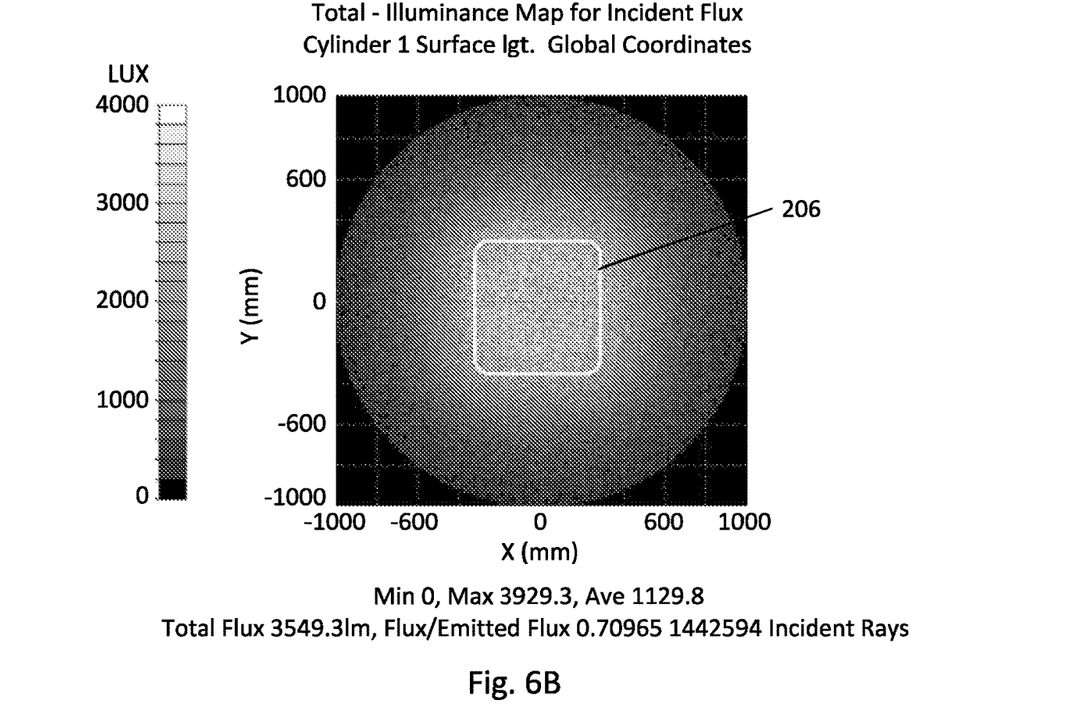

FIG. 6B shows the resulting square illuminance distribution 206 (at a distance of 1.1 m) for a Luminaire 200 incorporating the lens of FIG. 6A. Here the combination of the centrally aligned optic 214 with a large circular reflector 201 gives an illuminance distribution 206 which may be termed a 'lazy square'. That is a square with radiused corners.

A 'lazy square' may be considered to follow a shape approximating a contour given by the equation:

$$x^n + y^n = C, \quad (1)$$

where n is a positive even integer >2 (n=2 of course would result in the equation for a circle) and C is a positive constant. It will however be appreciated that such a mathematical definition is non-limiting.

Preferably, the edges of the distribution 206 should fade gradually rather than having a distinct sharp edge, as would be achieved by the normal combination of reflection and refraction of light from the luminaire. In this way even illuminance may be maintained even when tessellated with other luminaires in an array.

Figure 6C:
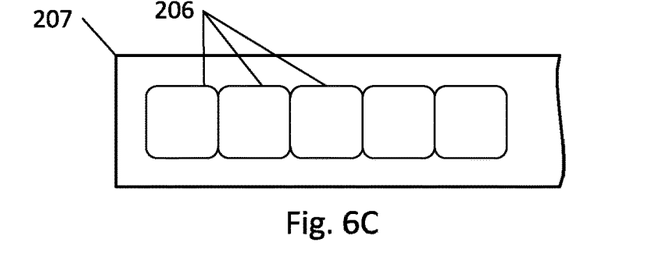

FIG. 6C shows an example illuminance distribution 206 when an array of luminaires 200 are used to illuminate a corridor 207, analogous to FIG. 2. A result of using an array of the example luminaires 200 is the possible avoidance of dark zones or bright zones in between the illumination areas 206. Thus, generally, a result of using an array of example luminaires 200 is much more uniform lighting compared to prior art systems.

It will of course be readily appreciated that other arrangements of the optic 214 may be implemented to suit the needs of a given area 207 which requires illumination. In one example, the deformed surface 214a—d could have three flattened areas to provide a triangular distribution, so as to e.g. match an angled corner of a room. In another example, an irregular flattening may be applied to provide an irregular illuminance pattern, so as to e.g. line up with a wavy wall. In general, any number of sides may be flattened with the degree of flattening changing the shape of the resulting illuminance pattern.

Figure 7A:
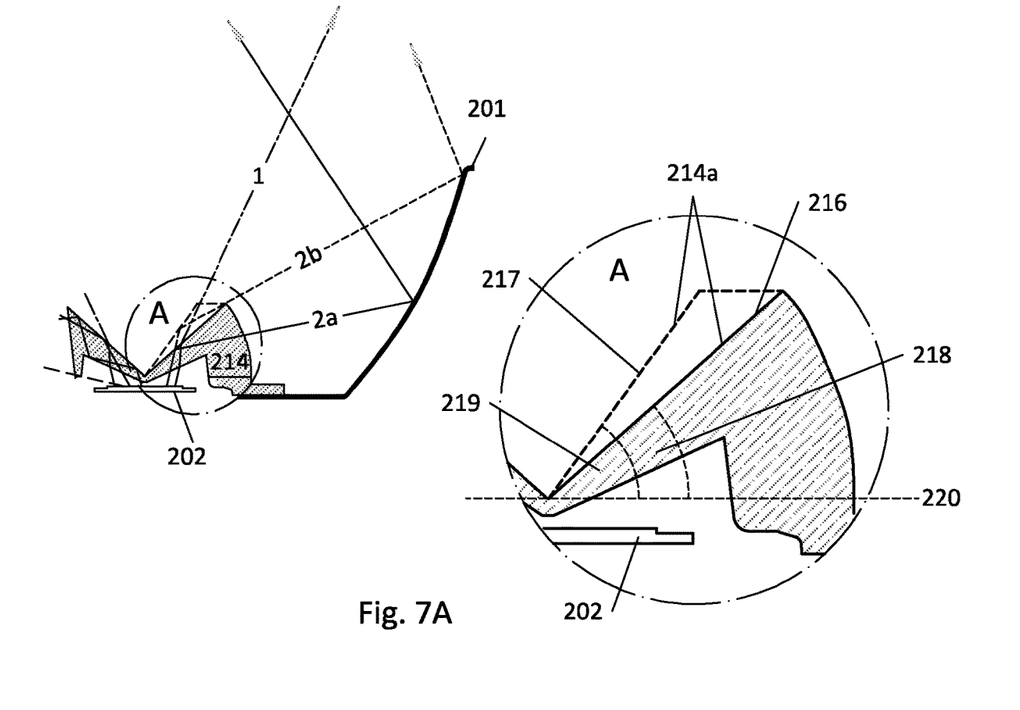
FIG. 7 shows example light transmission from the example luminaire in further detail.
Figure 7B:
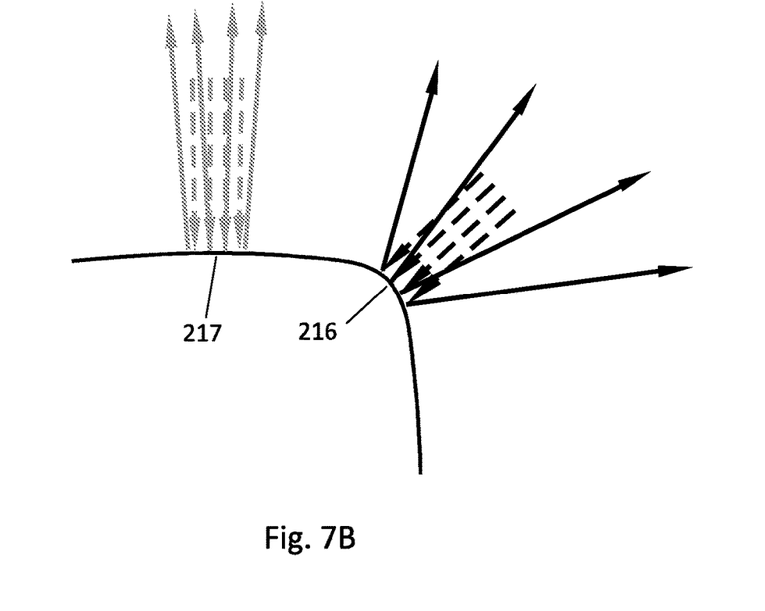

FIGS. 7A & 7B explore the mechanism by which the shaped surfaces create a shaped illuminance pattern in further detail.

At a 'corner' part 216 of the deformed surface 214a, an angle 218 between the surface 214a and a horizontal plane 220 running parallel with the light source 202 is more acute—i.e. shallower—than an angle 219 between a 'flat side' part 217 of the surface 214a and the plane 220.

The shallower angle 218 at the 'corner' part 216 results in the reflected/refracted light leaving the luminaire 200 at a shallower angle (see ray 2a). That is, the ray 2a is directed towards a side of the square illuminance pattern. The light here is dispersed by the radius (FIG. 7B) thus lowering the intensity. As such light reaching the sides of the illuminance pattern is reduced. The radius of the corner can be adjusted to vary the intensity and achieve good uniformity of illuminance. A good illuminance uniformity as understood by those skilled in the art might be Emin/Emax>0.7 (Emin and Emax being a minimum and maximum illuminance value respectively).

The steeper angle 219 at the 'flat side' part 217 of the deformed surface results in the reflected/refracted light leaving the luminaire 200 at a wider angle (see ray 2b). That is, the ray 2b is directed towards a corner of the square illuminance pattern. Conversely to the corner parts 216, the light from the flat sides 217 is more concentrated, thereby resulting in higher intensity. As such, light reaching corners of the illuminance pattern is increased. The bowing of the sides can be varied to achieve good illuminance uniformity; again e.g. Emin/Emax>0.7.

Figure 8:
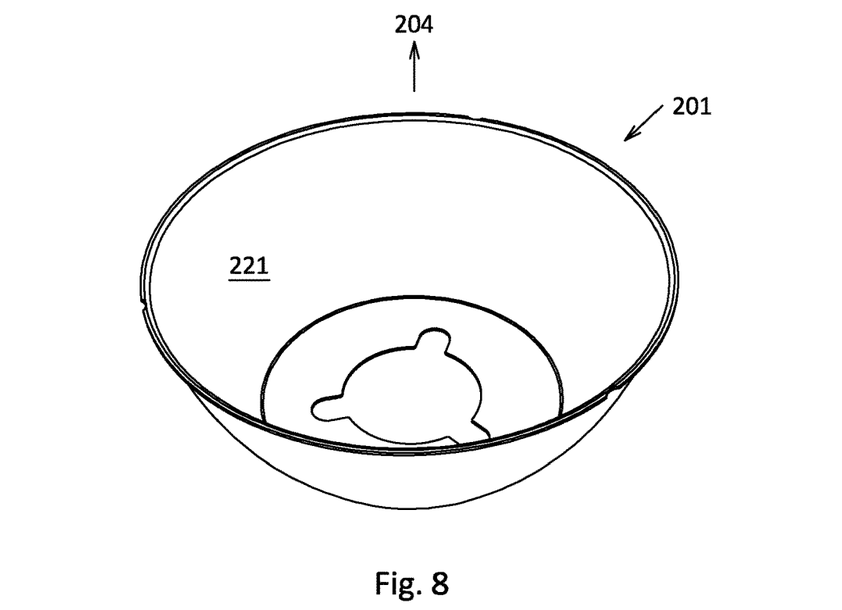
FIG. 8 shows an isometric view of an example third optic.

FIG. 8 shows the reflector 201 in greater detail. The reflector 201 in this example forms a dome-like structure around the second optic 214 such that the second optic 214 is substantially surrounded by the reflector 201 in all directions except the direction 204 propagating away from the luminaire 100.

Preferably, the reflector 201 is formed with a uniform (i.e. continuous) curvature. That is, an inner surface 221 which receives light from the lens 214 is uniform. Such uniform nature of the reflector 201 improves its aesthetic appeal and therefore the aesthetic appeal of the luminaire 200 generally. Aesthetics are an important consideration when designing new commercial spaces in the 21$^{st}$ century.

As will be evident from the discussion above, a size of the reflector 201 and a shape of the inner surface 221 are dependent on the light emission properties of the lens 214. It will therefore be appreciated that one can start the design process from the perspective of the reflector 201, e.g. so as to fit a desired ceiling cavity 203, from which the shape of the lens 214 can be determined dependent on the illuminance pattern desired. It will also be appreciated that the opposite can be true, starting the design process from the perspective of the optic 214 and sizing and shaping the reflector to suit.

Suitably, the reflector 201 can be manufactured by spin forming in order to provide a unitary structure and unitary surface 221. Spin forming is particularly advantageous because it is a low-cost manufacturing technique which is widely used within the lighting industry.

Alternatively, the reflector 201 may be formed from a plurality of individual segments which, when arranged together around the lens 214, result in a reflector 201 with uniform curvature. That is, to a casual observer, there would be no apparent difference between a spin formed reflector 201 and a segmented reflector 201.

In addition, the surface 221 of the reflector 201 may be provided with a specular or isotropic/non-isotropic diffused coating in order to further reduce glare produced by the luminaire 200.

Figure 9:
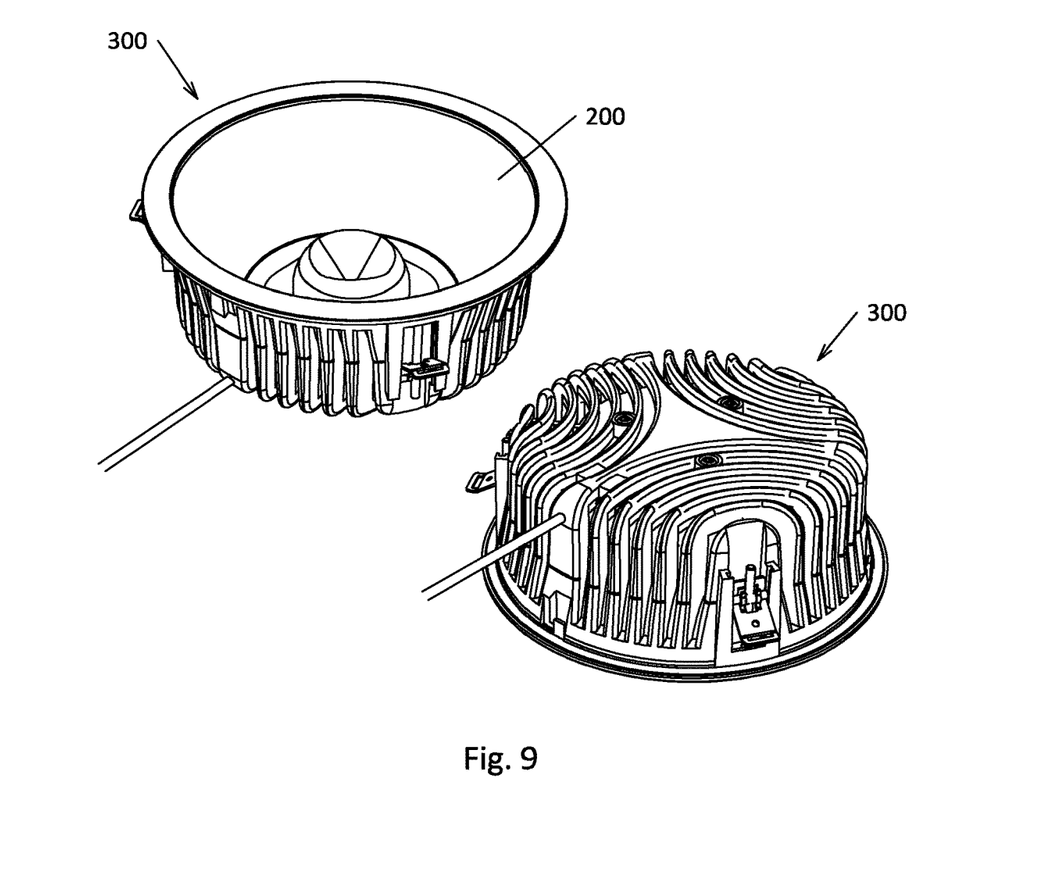
FIG. 9 shows an example housing for the example luminaire.

FIG. 9 shows a housing 300 for the aforementioned luminaire 200. The housing 300 provides means for cooling the luminaire 100 as well as mounting the luminaire 200, for example in the ceiling cavity 203 of a commercial space.

In summary an improved Luminaire has been disclosed which provides the advantages of non-circular illumination in a manner that is essentially covert in the physical appearance of the luminaire. The example luminaire comprises a light source including an integral primary optic which is configured to transmit light toward a second optic. The second optic is a lens configured to receive light from the light source via the primary optic and transmit at least part of the received light toward a circular reflector. The circular reflector is configured to direct light received from the second optic away from the luminaire. A shape of the second optic is interdependent with a shape of the circular reflector, and the shape of the second optic and circular reflector act in combination to transmit light away from the luminaire with a non-circular illuminance distribution.

The example luminaire may be manufactured industrially. An industrial application of the example embodiments will be clear from the discussion herein.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A luminaire, comprising:
   a light source including an integral primary optic configured to transmit light toward a second optic,
   the second optic configured to receive light from the light source via the primary optic, and transmit at least part of the received light toward a circular reflector,
   the circular reflector being configured to direct light received from the second optic away from the luminaire,
   wherein a shape of the second optic is interdependent with a shape of the circular reflector such that the second optic and circular reflector act in combination to transmit light away from the luminaire with a non-circular illuminance distribution, and
   wherein the second optic is quadrant symmetrical, comprising four flattened areas with corresponding corners at one or more of its inner and outer surfaces.

2. The luminaire according to claim 1, wherein the second optic comprises a lens.

3. The luminaire according to claim 1, wherein light which is transmitted toward the circular reflector by the second optic has been reflected by the second optic, or has been both reflected and refracted by the second optic.

4. The luminaire according to claim 1, wherein the second optic comprises at least one outer lens surface and one inner lens surface.

5. The luminaire according to claim 4, wherein one or more of the inner and outer surfaces of the second optic depart from circular by a predetermined degree.

6. The luminaire according to claim 5, wherein one or more of the inner and outer surfaces of the second optic proximate to a centre of the second optic are flattened.

7. The luminaire according to claim 1, wherein the non-circular illuminance distribution is a lazy square.

8. The luminaire according to claim 1, wherein the second optic is mounted centrally within the luminaire.

9. The luminaire according to claim 1, wherein the second optic further comprises a flange corresponding to a shape of the non-circular illuminance distribution.

10. The luminaire according to claim 1, wherein the circular reflector forms a dome-like structure around the second optic.

11. The luminaire according to claim 1, wherein the circular reflector is formed with a smooth, continuous curvature.

12. The luminaire according to claim 1, wherein an inner surface of the reflector comprises a specular or diffused coating.

13. The luminaire according to claim 1, wherein the circular reflector is configured to direct light through an aperture defined thereby.

14. The luminaire according to claim 1, wherein the circular reflector is a unitary structure.

15. The luminaire according to claim 1, wherein the circular reflector is formed from a plurality of segments.

16. A method of manufacture of a luminaire, comprising:
   arranging a light source including an integral primary optic to transmit light toward a second optic,
   arranging the second optic to transmit at least part of the received light toward a circular reflector,
   arranging the circular reflector to direct light received from the second optic away from the luminaire, and
   configuring a shape of the second optic to be interdependent with a shape of the circular reflector such that the second optic and circular reflector act in combination to transmit light away from the luminaire with a non-circular illuminance distribution, wherein the second optic is quadrant symmetrical, comprising four flattened areas with corresponding corners at one or more of its inner and outer surfaces.

* * * * *